(12) United States Patent
Wanner et al.

(10) Patent No.: US 10,799,971 B2
(45) Date of Patent: Oct. 13, 2020

(54) SYSTEM AND METHOD FOR SEPARATING A TUBULAR COMPONENT

(71) Applicant: Fraunhofer-Gesellschaft zur Foerderung der angewandten Forschung e.V., Munich (DE)

(72) Inventors: Martin Christoph Wanner, Nienhagen (DE); Hagen Herholz, Rostock (DE); Christian Kloetzer, Schwaan (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 31 days.

(21) Appl. No.: 16/329,597

(22) PCT Filed: Aug. 30, 2017

(86) PCT No.: PCT/EP2017/071742
§ 371 (c)(1),
(2) Date: Feb. 28, 2019

(87) PCT Pub. No.: WO2018/041881
PCT Pub. Date: Mar. 8, 2018

(65) Prior Publication Data
US 2019/0255642 A1    Aug. 22, 2019

(30) Foreign Application Priority Data

Aug. 31, 2016 (DE) .................. 10 2016 216 388

(51) Int. Cl.
*B23K 7/00* (2006.01)
*B23K 7/10* (2006.01)
(Continued)

(52) U.S. Cl.
CPC ................ *B23K 7/007* (2013.01); *B23K 7/10* (2013.01); *B23K 37/02* (2013.01);
(Continued)

(58) Field of Classification Search
CPC ................ B23K 7/003; B23K 7/006
(Continued)

(56) References Cited

U.S. PATENT DOCUMENTS

| 3,464,685 A | 9/1969 | Schreib |
| 4,378,934 A * | 4/1983 | Tucker .................. B23K 7/006 266/55 |

(Continued)

FOREIGN PATENT DOCUMENTS

| DE | 150 564 A1 | 9/1981 |
| DE | 10 2006 004 358 A1 | 8/2007 |

(Continued)

OTHER PUBLICATIONS

International Search Report for PCT/EP2017/071742, dated Nov. 29, 2017; English translation submitted herewith (5 pgs.).

*Primary Examiner* — Scott R Kastler
(74) *Attorney, Agent, or Firm* — Fitch, Even, Tabin & Flannery LLP (57) ABSTRACT

A system and a method for separating a tubular component is disclosed, which for constructing a supporting structure, having a longitudinal pipe with pipe ends which are open on both sides. The system has a mobile transport module comprising a receiving platform having a pipe clamping device for clamping variable pipe diameters which receives and mounts the tubular component so that a first pipe end of the component, having a vertical longitudinal axis which detachably and securely engages the pipe clamping device. The invention further relates to a separating arrangement mounted on a supporting structure that it is deflectable at least vertically, to provide secure joining to the pipe end of a tubular component that faces away from the first pipe end. The tubular component is seated on the transport module and vertically securely engages the pipe clamping device.

13 Claims, 5 Drawing Sheets

(51) Int. Cl.
*B23K 37/02* (2006.01)
*B25J 9/00* (2006.01)
*B23K 103/04* (2006.01)
*B23K 101/06* (2006.01)
*B23K 101/10* (2006.01)

(52) U.S. Cl.
CPC ...... *B23K 37/0217* (2013.01); *B23K 37/0276* (2013.01); *B25J 9/0018* (2013.01); *B23K 2101/06* (2018.08); *B23K 2101/10* (2018.08); *B23K 2103/04* (2018.08)

(58) Field of Classification Search
USPC .............................................. 266/52, 55, 77
See application file for complete search history.

(56) References Cited

U.S. PATENT DOCUMENTS

| 4,480,821 A | 11/1984 | Noll et al. |
| 2017/0021461 A1 | 1/2017 | Hamacher |

FOREIGN PATENT DOCUMENTS

| DE | 10 2007 015 071 A1 | 10/2008 |
| DE | 10 2013 018 417 A1 | 6/2015 |
| EP | 0 082 274 B1 | 4/1986 |
| GB | 2 254 172 A | 9/1992 |
| WO | 2013/072016 A1 | 5/2013 |

\* cited by examiner

SYSTEM AND METHOD FOR SEPARATING A TUBULAR COMPONENT

CROSS REFERENCE TO RELATED APPLICATIONS

Reference is made to PCT/EP2017/071742 filed Aug. 30, 2017, and German Application No. 10 2016 216 388.4 filed Aug. 31, 2016, which are incorporated herein by reference in their entirety.

BACKGROUND OF THE INVENTION

Field of the Invention

The invention relates to a system and a method for separating a tubular component which is suitable for constructing a supporting structure, in particular in the form of offshore or bridge constructions and has a longitudinal pipe with pipe ends that are open on both sides.

Description of the Prior Art

Amid the growing trend towards abandoning conventional energy generating systems, efforts to develop sources of renewable energies are advancing unabated. In order to achieve the stated energy transition objectives, offshore wind turbines are expected to contribute substantially to power generation requirements. As a consequence, the output of wind turbines currently in development is increasing steadily. The hub heights achieved in this process and the necessary and preferred erection of the systems in open water offshore regions demand open foundation structures in forms referred to as jackets, tripiles and tripods. The jacket concepts have already proven themselves in the oil and gas industry and their open lattice structure affords them a weight advantage of 40% to 50% over monopile structures. In this context, a large portion of the erection costs are associated with the production of the tube joints, which are constructed as welded joints representing tube-tube connections. Jacket foundations for wind turbines and the foundation structures for converter platforms involve particularly large numbers of these joints. Since the cumulative erection costs increase with the height of the hub, in the future it will be essential to implement cost-reducing manufacturing processes for these kinds of foundation structures. Moreover, in view of the unceasing development of new erection sites which are usually very remote from each other, questions of concern such as construction logistics are becoming more and more pressing.

Tube joints, which typically consist of a base tube and at least one connecting pipe socket, are standard connecting elements of intersecting pipes in steel construction and are used in large numbers in lattice mast structures, and in bridges and open structures such as the aforementioned jackets, tripods or tripiles. Because of the various types of jacket structures and the variety of structural designs, tube joints are typically used in X-, Y-, K- and double-K configurations. Within these structural forms, the joints differ in terms of connecting angle, positioning of the sockets, sheet thickness and pipe diameter, with the result that a very large number of different joint types may be used in just a single open structure.

The trim of the pipe sockets, that is to say the preliminary assembly of a pipe socket by creating a suitably selected intersection profile along which the shell surfaces of the two pipe sockets to be joined can be brought into contact with each other is carried out according to the current state of the art using fully mechanised oxy-fuel cutting equipment. For typical pipe diameter dimensions of 1 to 3 m, a pipe socket is connected to a base tube by manual welding. To date, there are no systems in existence that combine both trimming a pipe socket and welding the pipe joints in one comprehensive solution.

For the purpose of trimming a pipe there are fully mechanised solutions which provide a clamping and bearing arrangement that is able to cause a pipe that is to be cut or locally separated to rotate about a horizontal axis of rotation with motorized assistance. A separating tool which can be deflected bidirectionally along at least one linear axis is mounted spatially beside the clamping arrangement which provides rotatable support for the horizontally mounted pipe segment and its displacement along the shell surface of the pipe segment is overlaid on the rotational movement of the horizontally supported pipe segment, so that the pipe segment is separated along a definable separation curve.

Fully mechanised pipe cutting systems of such kind are suggested in EP 0 082 274 B1, DE 34 39 431 C2, DT 24 30 513 A1 and DD 150 564 for example. The known pipe cutting systems based on the abovementioned system concept are of necessity limited to a fixed position system installation because of the very large assembly space they occupy and the substantial total weight of the equipment, and their deployment to another production site is associated with very considerable expense. Since the rotatable mounting of the pipe segment to be worked and that of the separating tool are mechanically decoupled from each other, the two system components must be positioned very precisely in space. A further disadvantage relates to the handling of the part separated from the pipe segment, referred to as the "bad part", which only drops off the pipe segment or is transported away in an inconsistently controlled way. Thus for example the time when a relative movement begins between the good and the bad part or the time of final separation of the two parts from each other cannot be determined precisely due to the interaction of a number of influencing factors, such as thermal load of the component, the effect of gravity, etc. This can cause locally limited impairment of the quality of the cut and damage to system components or even to the pipe segment that is to be cut.

The intense handling effort that must be applied in order to shift the good part which is cut to size and mounted rotatably in the clamping device from its horizontal position into a vertical position suitable for a subsequent process of joining it to a base tube must also be considered unfavourable. Accordingly, the cut-to-size pipe segment must first be brought into a vertical position with the aid of a crane system or similar handling equipment with appropriate load-bearing capacity, and then brought into position on the base tube, which entails re-harnessing, that is to say changing the corresponding mechanical anchor points between the two process steps, and this too represents additional handling effort.

Document DE 10 2006 004 358 A1 refers to a method and a device for separating a pipe thermally using a burner head, in which a pipe clamping and rotating device is not used. The pipe is nevertheless cut to size with the pipe in the horizontal position, but the cutting is carried out from the inside of the pipe, and the circumferential movement of the separating-welding burner along a cutting contour is performed by the cutting burner system itself. Otherwise, the known device has all of the same disadvantages with regard to system installation, detaching of the bad part and the substantial handling effort.

Document WO 2013/072016 A1 suggests a method and a device for welding and also for cutting components, particularly pipes for building offshore structures. The cutting and/or welding device provides linear guides which can be attached directly to the base tube, and a separating welding tool is mounted on each of the guides in such manner as to be bidirectionally deflectable. The reachability and accessibility of the track points along the separating or cutting contour depends to a large degree on the operating range and assembly space of the manipulator unit that supports the cutting and welding tool, which unit usually has the form of an industrial robot. An increase in the manipulators operating range most often entails an increase in the assembly space requirement and greater overall weight of the kinematics supporting the separating and/or welding tool, which in turn directly affects the load-bearing capacity of the of the rail linear guide which is attached directly to the pipe. However, with the known separating-welding arrangement, it is only possible to create local openings along the shell surface of the base tube. Pipe cuts which pass round the entire circumference of the pipe as not possible with the known device.

Document DE 10 2007 015 071 A1 suggests a modular automated machine for cutting and welding tubular and flat workpieces which provides kinematics that are movable about 7 spatial axes, and to which the processing tool is attached. The machine is of compact design and can be suspended in the room so that it can be displaced translationally.

Document DE 10 2013 018 417 A1 discloses a tube-profile cutting machine, with which it is possible to process pipes that are mounted horizontally. For this purpose, the machine provides a vertically movable robot arm with a cutting tool attached to the end of the arm. The pipe to be processed is fed to the processing area of the cutting tool by using a translational and also rotational conveyor mechanism.

SUMMARY OF THE INVENTION

The object underlying the invention is to improve a system for separating a tubular component that is suitable for constructing a supporting structure, in particular in the form of offshore or bridge constructions in such manner that pipe sockets can be cut to size with a high degree of precision and very exactly, and this may be erected with a separating arrangement that can be moved without excessive transport and installation effort for use at any deployment site. The quality and precision with which a tubular component is to be cut with the aid of a separating tool along a predefined separation trajectory should be improved significantly. It is also important to create the conditions for reducing the effort in all process engineering aspects which is required for pre-assembly, that is cutting a pipe segment to size and matching and joining the cut-to-size pipe segment to a correspondingly prepared base tube.

The system according to the invention for separating a tubular component which is suitable for constructing a supporting structure, in particular in the form of offshore or bridge constructions and has a longitudinal pipe with pipe ends that are open on both sides, has a mobile transport module which comprises a receiving platform with a pipe clamping device that can be adapted to a variety of pipe diameters, which is designed to receive and stably mount the tubular components in such a way that a first, lower pipe end of the component, which is oriented vertically, can be brought into detachable, secure engagement with the pipe clamping device.

Further, a separating arrangement is provided that is mounted on a supporting structure such that it can be raised and lowered vertically, and is preferably spatially freely positionable. The supporting structure may advantageously be embodied in the manner of a scaffold-like superstructure or in the form of a crane-like support arm, on which the separating welding assembly is mounted so as to be movable vertically preferably spatially freely positionably. The supporting structure is preferably constructed such that it can be assembled and disassembled so that its deployment is not limited to one location and it can be erected and dismantled according to requirements on terrestrial or water-supported production sites. Of course, resources already in place at the site in the form of support frames or crane systems may also be used for the supporting structure.

The separating arrangement is additionally equipped with a fastening arrangement for detachable, secure joining to the upper, second pipe end of the tubular component that is seated vertically on the mobile transport module. For this purpose, the fastening arrangement engages in the upper pipe end, thereby creating a self-centring form-fitting joint by applying a clamping force that acts solely on the inner wall of the tubular component, which joint is also strong and stable enough to be able to raise the entire tubular component by means of the separating welding assembly suspended from the supporting structure and to position it suitably.

Finally, a manipulator unit is mounted indirectly or directly on the fastening arrangement, preferably in the form of a 6-axis, open kinematic chain, in the manner of a vertical articulated-arm robot, for example, but at least in the form of a 3-axis kinematic chain with a separating tool mounted on the freely positionable manipulator end thereof.

In the securely joined state, the fastening arrangement seated on the upper pipe end and the separating-welding tool connected via the manipulator unit are in a fixed, defined spatial relationship with the tubular component, that is to say a common coordinate system is assigned to the component and the separating welding assembly. Within the common coordinate system, the separating tool may be guided relative to the tubular component precisely along a predefined trajectory which is radially outside of the tubular component and corresponds to the separating line along which the tubular component may be divided into two separate component parts. As a rule, the upper component part resulting from the component separation, to which the fastening arrangement of the separating welding assembly is joined, corresponds to the good part, and the lower component part, which is seated on the mobile transport module, corresponds to the bad part, which has to be transported away.

In order to create a detachable secure connection of the tubular component with the receiving platform of the mobile transport module, which is preferably embodied as a low-loader vehicle or a device which can be handled by a mobile loading unit, the pipe clamping device comprises at least two clamping blocks which are mounted so as to be movable and lockable along the receiving platform and are arranged and constructed such that the clamping blocks on the inside of the vertically oriented tubular component which is supported indirectly or directly on the receiving platform, are distributed evenly along the inner wall thereof, can be brought into engagement with the tubular component, exerting clamping forces directed radially outwardly against the inner wall. Alternatively or additionally, the clamping blocks may also be radially outside of the vertically oriented tubular component which is supported indirectly or directly on the receiving platform, distributed evenly along the outer wall thereof, and can be brought into engagement with the tubular component, exerting clamping forces directed radially inwardly against the outer wall.

The clamping blocks are preferably braced by pneumatic, hydraulic or electromotor force against the inner and/or outer wall of the vertically oriented tubular component seated on the receiving platform. Preferably, there are three, four or more clamping blocks of such kind provided to ensure that the tubular component, which may reach a height of several metres, is seated securely and firmly on the mobile transport module.

In a preferred embodiment, the clamping blocks, which are each arranged so as to be movable or displaceable bidirectionally along the receiving platform each have vertically adjustable bracing structures, which are constructed and arranged in such manner that each bracing structure of each individual clamping block can be brought into local engagement with the circumferential front rim of the lower pipe end. For this purpose, the bracing structures are preferably forked and in this way surround the lower frontal rim of the tubular component locally or sectionally. Because of the independent vertical deflectability of each individual bracing structure, it is possible to receive and support tubular components with a lower pipe end which has a pipe rim terminating with an end face contour of any shape. Further details on this subject are given in the description with reference to the specific embodiments.

In a further preferred embodiment, besides the pipe clamping device a vertically displaceable bracing unit is also mounted on the receiving platform of the mobile transport unit and is preferably arranged in the middle or centrally between the at least two, preferably three, four or more clamping blocks. The vertically displaceable bracing unit is preferably designed to be extendable telescopically and has an upper receiving or bearing platform on which the separating arrangement rests, at least when a firm joint exists between the fastening arrangement and the tubular component. The spatially fixed support of the separating arrangement on the vertically displaceable bracing unit guarantees a stable, spatially fixed positioning of the separating arrangement, in particular also at the moment when the tubular component is cut into two separate component parts by the separating tool. The vertically displaceable bracing unit serves to prevent the upper separated component part from resting without constraint on the lower component part or damaging it. Instead, because it is joined firmly to the separating arrangement the upper component part remains spatially immobilised and is kept at a distance from the lower component part even after the separation by the separating line formed in the separating welding process.

After the separation is completed, the upper component part may be lifted off the transport module with the aid of the separating arrangement mounted on the supporting structure and transported to any location, e.g., for intermediate storage or further processing in a welding operation to join it to a suitably supported and correspondingly pre-assembled base tube. Similarly, the lower component part which is seated on the mobile transport module may be transported away, disposed of or returned for reuse.

If the separating arrangement is only deflected vertically, the mobile transport module carrying the bad part moves away so that a second mobile transport module, preferably of identical construction, can be used to receive the good part.

More detailed explanations of the preferred variant of the separating arrangement are provided in the following description with reference to a preferred embodiment.

The system according to the invention for separating a tubular component makes a novel method for separating a tubular component possible, as well as the subsequent design and creation of a supporting structure, in particular in the form of offshore or bridge constructions. The novel method is characterized in that in a first step a tubular component with vertically oriented longitudinal pipe is arranged on a receiving platform of a mobile transport module such that the tubular component is movable and freely positionable along a production plane.

A supporting structure is mounted on the production plane and rises above it, and may be embodied for example as a support scaffold or some kind of crane system on which a separating arrangement is arranged such that it may be at least raised and lowered vertically, and is preferably spatially freely positionable. The term "spatially freely positionable" means a deflection of the separating arrangement along three spatial axes aligned orthogonally to each other. Subsequently, the tubular component and the separating arrangement are aligned relative to each with the aid of the transport platform such that the separating arrangement is set down vertically on the upper pipe end of the tubular component which is seated vertically on the transport platform and is connected securely and detachably to tubular component at the upper pipe end, creating a form-fitting connection.

After the spatially fixed connection has been created between the separating arrangement and the tubular component, the tubular component is separated along a predetermined separating curve to obtain separated component parts, in the form of a lower and an upper component parts, by use of at least one separating tool which is mounted on the separating arrangement.

The separation process is carried out such that the separating tool radial is arranged outside the tubular component and guided around the tubular component along the separating curve.

In order to prevent the upper component part from tilting relative to the lower component part and/or at least sinking by a distance of the parting line created between the two component parts during and after the separating process and so damaging the cutting contour created, the separating arrangement and the upper component part connected in form- and force-fitting manner thereto is braced against the mobile transport module separately from the tubular component, thereby securing the upper component part against sinking in an undefined manner.

After complete separation, the upper component part is raised by means of the freely positionable separating welding assembly and moved to an appropriate location. The lower component part resting on the mobile transport module may be removed in the same way and disposed of or returned for reuse.

Besides the performance of separation tasks on tubular components, the system according to the invention also lends itself advantageously to reworking components in this respect. By replacing the separating tool correspondingly with a grinding tool, grinding work may be carried out on weld toes, for example, particularly at the transition between the welding seam and the base material of the components preferably for grinding the weld toe of the cap pass to reduce notching effects and an associated increased resistance of the welded joint to dynamic loads. It is also possible to apply the grinding process for working the root and filler beads, that is, to remove defects or the like within the weld seam.

BRIEF SUMMARY OF THE DRAWINGS

In the following text, the invention will be explained without limitation of the general inventive thought for exemplary purpose using embodiments thereof and with reference to the drawing. In the drawing:

FIG. 5a-d shows a sequence of images representing the performance of a separating welding process on a tubular component.

DETAILED DESCRIPTION OF THE INVENTION

Figure 1:
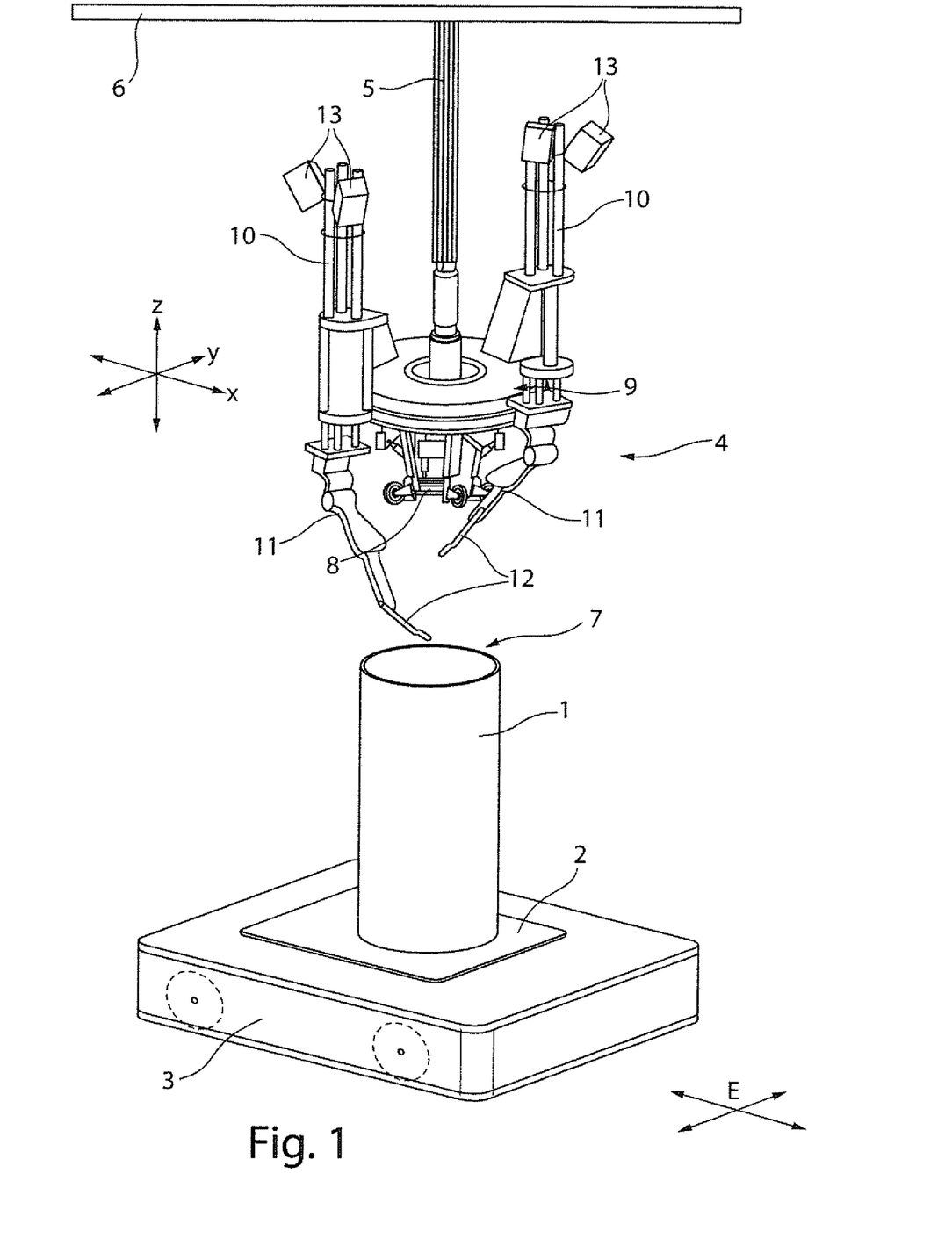
FIG. 1 shows a general overview of the system according to the invention.

FIG. 1 is a perspective showing a diagrammatic view of the system according to the invention for separating a tubular component 1, which in FIG. 1 is a straight steel cylinder supported on a horizontally oriented receiving platform 2 of a mobile transport module 3, which travels freely along a production plane E. The mobile transport module 3 illustrated in FIG. 1 is preferably a low-loader transport vehicle. Alternatively, it is also possible to implement the mobile transport module 3 in the form of other load-bearing vehicles with carrier function or devices that are operable in the production plane.

The system according to the invention also provides a separating arrangement 4 which is separate for the mobile transport module 3 and also separate from the tubular component 1. The separating arrangement is supported on a supporting structure 6 such that it can be at least raised and lowered vertically by means of a suspension assembly 5, preferably via cable winches for the purpose of processing preparation and setup. The considerably simplified suspension assembly 5 represented in FIG. 1 is to be understood to represent any conceivable form of mechanical connection between the separating module 4 and the load-bearing supporting structure 6. The supporting structure 6 may be embodied as a lattice framework which is braced intrinsically stably on production plane E. Equally, it is also possible to support the weight of the separating arrangement 4 with a stationary or mobile crane system, which also enables vertical movements, preferably a spatially free positioning of the separating arrangement 4.

Given the capability of mobile positioning of the tubular component 1 along the production plane E by using the transport module 3 and the at least vertically variably positionable separating arrangement 4, it is possible to transfer the tubular component 1 and the separating arrangement 4 to a vertically overlapping position, in which the separating arrangement 4 is lowered vertically in the direction of the upper, open pipe end 7 of the vertically oriented tubular component 1.

The separating arrangement 4 is equipped with a fastening arrangement 8 which is arranged below a support platen assembly 9 of the separating arrangement 4 and opens into the interior of the tubular component 1, while the support platen assembly 9 is supported on the circular upper pipe end 7 which terminates at the front face.

The separating arrangement 4 is connected detachably and securely to the inner wall of the tubular component 1 by use of a form-fitting joint via the fastening arrangement 8.

Two linear arrangements 10 are mounted along the peripheral border of the support platen assembly 9, and are mounted so as to be deflectable vertically downwards and upwards when the separating arrangement 4 is joined to the tubular component 1. A manipulator unit 11 in the form of an at least 3-axis kinematic chain, but preferably in the form of a six-axis open kinematic chain, like a vertical articulated-arm robot for example, is mounted on the bottom end of each linear unit 10, and a separating tool 12 is provided on the manipulator end thereof.

The linear units 10 together with the manipulator unit 11 are attached to each other and the separating tool 12 is mounted to be rotatable about the support platen assembly 9 and thus also rotatable about the outer circumference of the tubular component 1.

By providing two separating tools 12, the duration of a separating process can be halved, which is notably advantageous particularly in cases in which tubular components 1 with large wall thicknesses are to be separated.

In order to supply a process gas to each separating tool 12, the embodiment illustrated in FIG. 1 provides at least one supply module 13, which contains all of the components relating to the cutting process, such as a control unit, an electrical power supply unit and at least one reservoir for materials required for the separating welding process, comprising at least the process gas.

Figure 2:
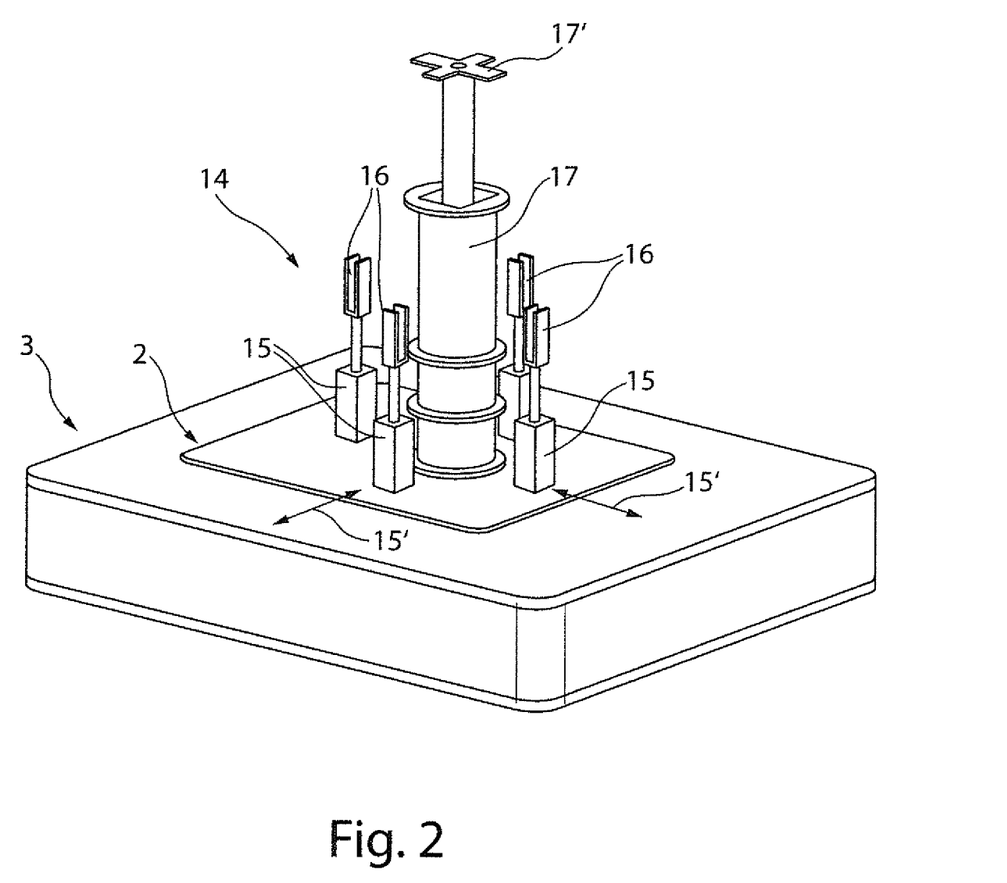
FIG. 2 shows a mobile transport system.

FIG. 2 illustrates an embodiment of the construction of a mobile transport module 3. The mobile base is preferably supplied in the form of a low-loader vehicle having a flat, horizontal receiving platform 2, on which a pipe clamping device 14 is mounted, which in the embodiment of FIG. 4 comprises four clamping blocks 15. Each of the individual clamping blocks 15 is movable along a linear axis 15' and also lockable relative to the receiving platform 2. In order to fasten a tubular component 1 detachably and securely, the clamping blocks 15 are pressed flush against the inner wall of the tubular component 1 under the effect of a pressing force and braced against the wall. In order to deflect the individual clamping blocks 15 along their displacement axes 15' and generate a clamping force enabled thereby to act on the tubular component 1 and secure it on the mobile transport module 3, the individual clamping blocks 15 are mounted such that they are deflectable by electromotor, pneumatic or hydraulic means.

In addition, each individual clamping block 15 has a vertically deflectable bracing structure 16, which serves to surround and receive the pipe rim structure locally at the face thereof preferably in the manner of a fork.

Finally, the mobile transport module 3 provides a vertically displaceable bracing unit 17 with a receiving platform 17' which serves to receive and support the separating cutting device 4. In this way, the receiving platform 17' whose height can be adjusted individually prevents the separating cutting arrangement from sinking during and after a desired cutting contour has been created along the circumferential border of the tubular components. Preferably, the bracing unit 17 provides a spindle-driven, telescopic support mechanism for vertical height adjustment of the receiving platform 17'.

Figure 3:
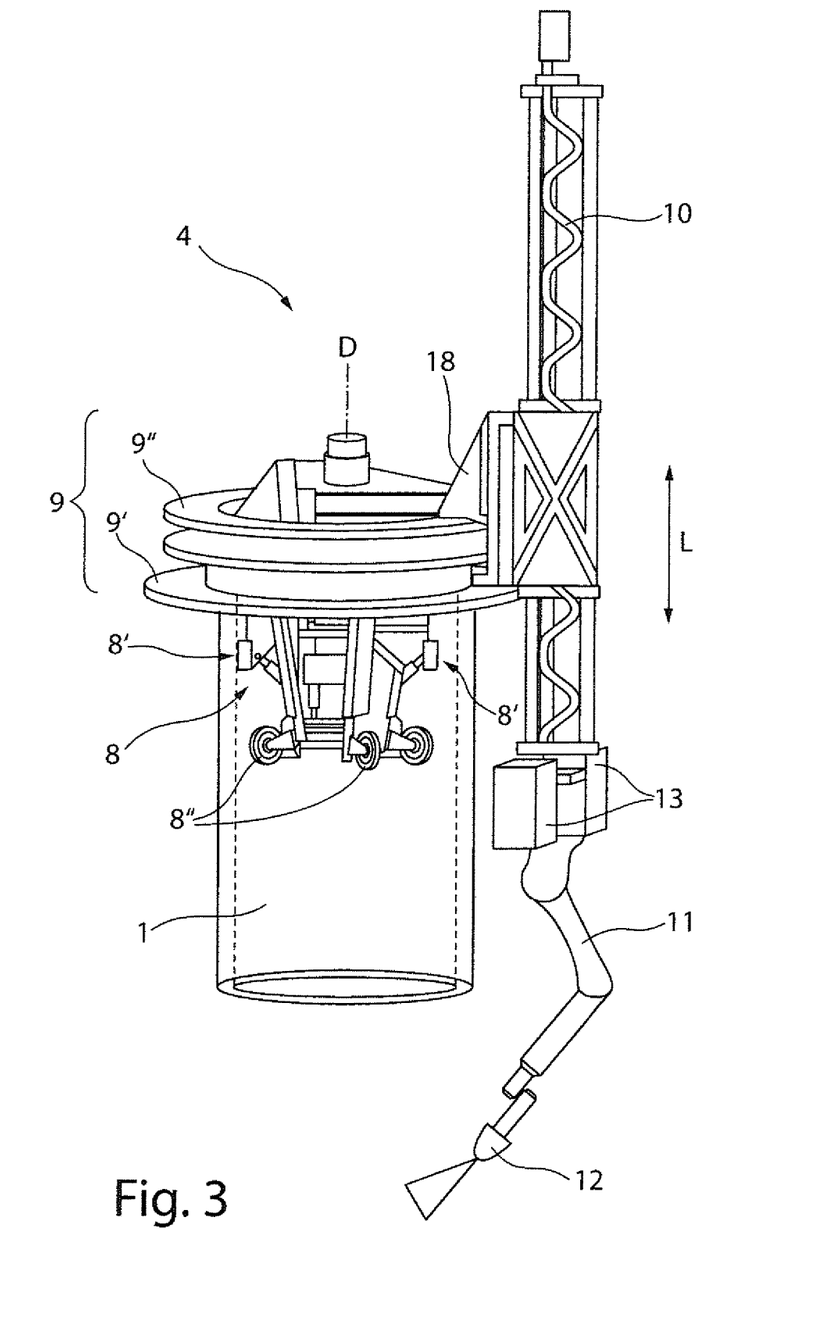
FIG. 3 is a detailed representation illustrating the separating welding assembly attached to the tubular component in detailed general view.

FIG. 3 illustrates a schematic representation of the separating cutting arrangement 4 joined securely to a tubular component 1. For reliable, detachably secure support of the separating cutting arrangement 4 solely at the upper end of the tubular component 1, the fastening arrangement 8 protruding into the interior of the pipe includes motor-driven clamping jaws 8' which may be pressed radially against the inner wall of the tubular component 1, which fix the fastening arrangement 8 and therewith also the entire separating cutting arrangement 4 centrally to the tubular component 1. In all, the fastening arrangement 8 has three, four or more clamping jaws 8' of such kind. Rollers 8" mounted so as to be freely rotatable on the lower end of the fastening arrangement 8 help to enable the fastening arrangement 8 to be introduced into the upper pipe end of the tubular component 1 more easily and without causing damage.

The support platen assembly 9 provides a lower support platen 9' which enters into direct frontal contact with the upper end of the tubular component 1. A carrier ring module 9" is provided that is rotatable with respect to the lower support platen 9' and is driven by a motor about the axis of rotation D. The linear units 10 are each connected fixedly to the carrier ring module 9" via a holding device 18 and are displaceable by motor along the linear axis L, which corresponds to the vertical axis when the separating arrangement 4 is in the connected state with the vertically oriented tubular component 1. The manipulator unit 11 is attached to the lower end of the linear unit 10, and the separating tool 12 is attached to the manipulator end thereof so as to be spatially freely positionable.

In the embodiment shown in FIG. 3, corresponding supply modules 13 are provided at both the upper and the lower ends of the linear unit 10 to enable the separating operation to be carried out in a controlled, power-assisted manner.

Figure 4:
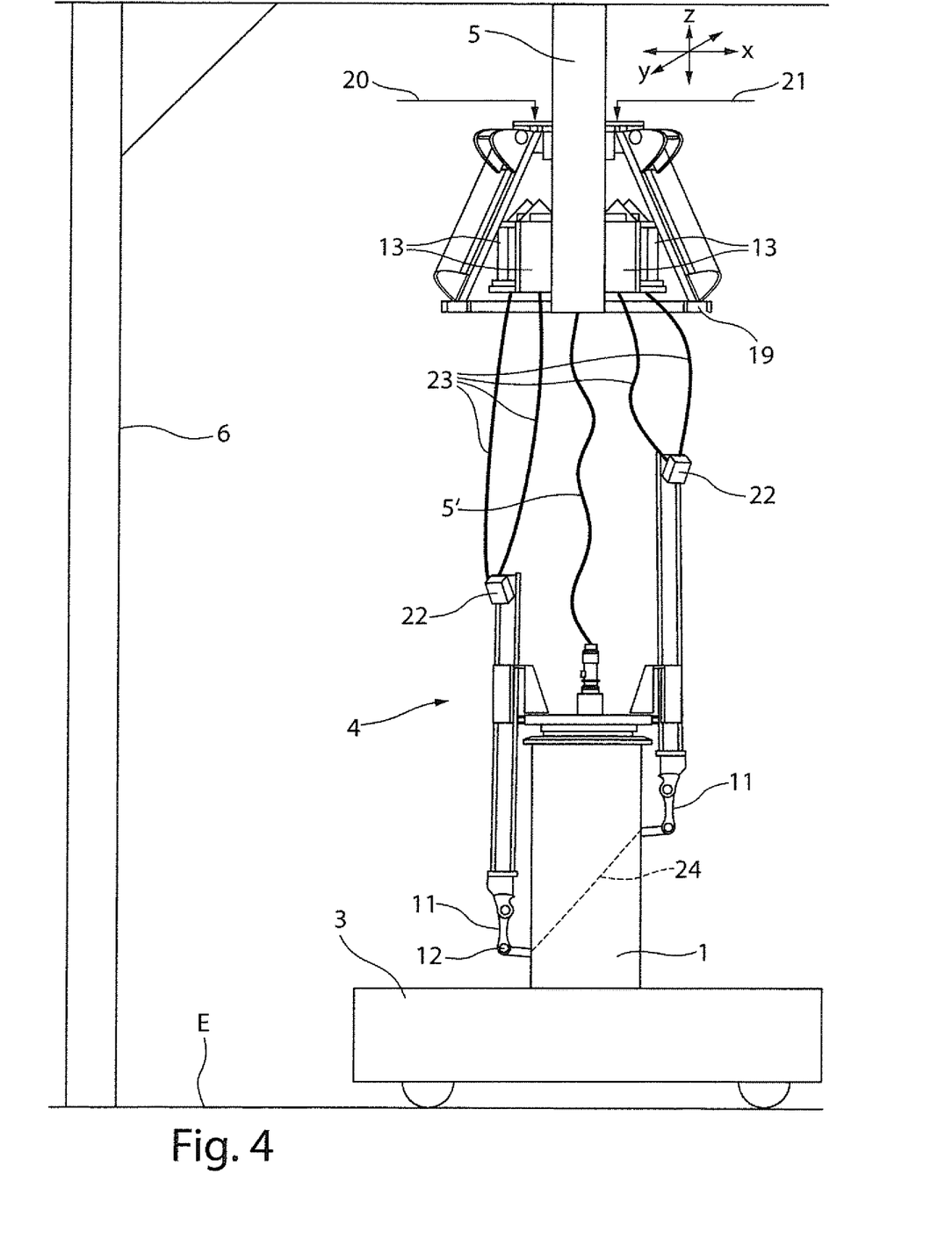
FIG. 4 shows the overall system.
Figure 5:
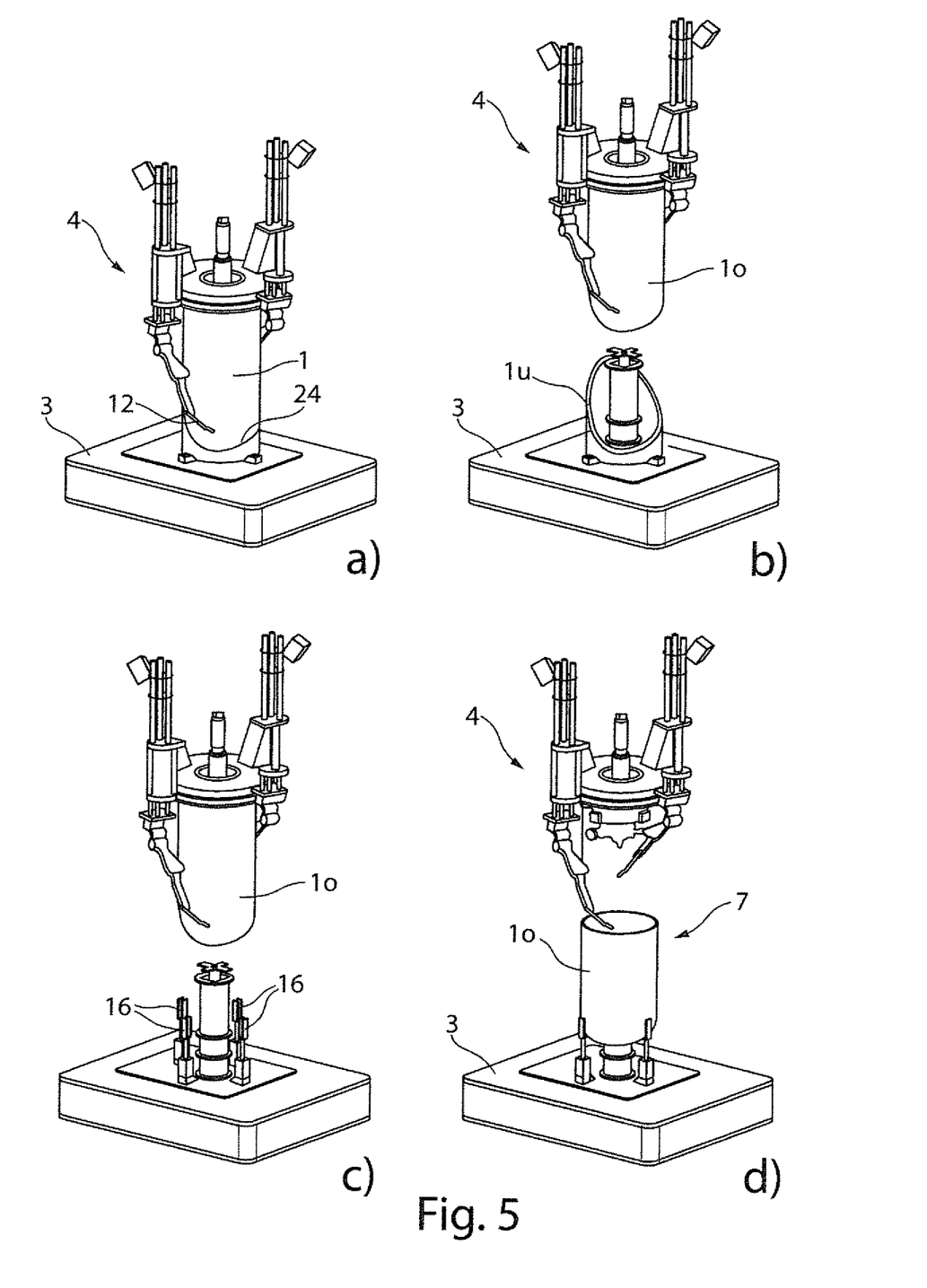

In the representation according to FIG. 4, the state is illustrated in which the separating welding assembly 4 is joined firmly to the upper pipe end 7 of the tubular component 1. In the case shown in FIG. 4, the separating arrangement 4 is attached via a connecting means 5' to a carrier module 19, on which essential supply components for the separating process are accommodated, as will be explained subsequently. The carrier module 19 is connected to the supporting structure 6 via the suspension assembly 5.

The suspension assembly 5 and the connecting means 5' ensure that the separating device 4 may be positioned without spatial limitation along the orthogonally oriented spatial directions x, y, z marked in FIG. 4. The suspension assembly 5 is advantageously connected to the supporting structure 6 via a rail suspension assembly for guiding and/or positioning the module carrier 19 and the separating arrangement 4 which is coupled therewith via the connecting means 5', and enables deflection of the suspension assembly 5 along the x- and y-directions indicated. Telescopic mechanisms, cylinder stroke units, spindle drives, control wire drives to name just a few are suitable arrangements for creating the connecting means 5' for the spatial positioning of the separating arrangement 4 along the vertical z-axis.

All of the logistical components and supply modules 13 necessary for the separating process are accommodated on the module carrier 19. These comprise one control and power unit for each separating tool 12 and a reservoir for process gas. The supply of energy and transmission of corresponding control signals to the supply modules 13 located on the module carrier 19 preferably takes place via an external cable feed 20, which is coupled via a slipring coupling (not shown) disposed centrally in the area of the module carrier 19. Depending on requirements, a further external feed line 21 is provided, via which process gas is supplied. The connection of the process gas to the supply modules 13 accommodated on the module carrier 19 is also assured via a fluid-tight slipring coupling (not shown). This enables external energy source and also gas reservoirs, in the form of gas bottles for example to be kept in reserve in readily accessible locations in the area of the production plane E and used accordingly.

Finally, flexible connecting lines 23 are provided between the supply modules 13 and corresponding connecting units 22 at the upper ends of the linear units 10 and serve to supply the separating tools 12 with energy as well as the process gas needed for the separating process.

Because of the rotatable mounting of the separating tools 12 about the longitudinal axis of the tubular component 1 which is enabled by the carrier ring module 9", it is necessary to rotate the supply modules 13 arranged on the module carrier 19 about the pipe longitudinal axis in the same mode as the rotating motion of the separating tools 12, in order to prevent the connecting lines 23 from becoming twisted and suffering damage.

In all other aspects and except for the special design of the separating tool 12, the separating arrangement 4 described above is explained comprehensively in a patent application PCT/EP2016/055623 and DE 10 2015 206 044.6 which is unpublished at the time of this application. The welding assembly described in the two abovementioned applications is used to join two pipe sockets with the aid of a welding tool. With the exception of the welding tool described therein, the constructive design is otherwise identical to the separating apparatus disclosed as part of the present application. In this context, reference is made to the disclosure contents of the two abovementioned documents in their entirety.

FIGS. 5a to d describe the process of separating a tubular component with the aid of the system according to the invention in the form of an image sequence.

The process state shown in FIG. 5a, in which the tubular component 1 is already releasably and securely mounted in vertical orientation on the mobile transport module 3 and the separating arrangement 4 is seated on the upper pipe end of the tubular component and is joined in spatially defined manner to the tubular component 1 by use of the fastening arrangement is preceding by the step of loading the mobile transport module 3 with the tubular component 1. For this purpose, the tubular component 1 is positioned opposite the pipe clamping device on the receiving platform 2 of the transport module 3 with the a crane system (not shown) for example and lowered. As was described previously, the tubular component 1 is fixed securely on the mobile transport module by use the pipe clamping device. It is also necessary to position the mobile transport module 3 relative to the separating arrangement 4. It is further important to center the separating arrangement 4 in suitable manner coaxially with the tubular component 1 seated on the mobile transport module 3 and to lower it accordingly.

The separating arrangement 4 is lowered onto the upper pipe end with the suspension assembly (not illustrated in FIG. 5) for example with cable winches, wherein the separating welding assembly 4 bears in a supporting manner on the receiving platform 17' described with reference to FIG. 2. For purposes of locking and fixing the separating welding assembly 4 in place relative to the tubular component 1, the clamping jaws 8' described with reference to FIG. 3 are moved radially outwards.

After the separating arrangement 4 has been secured correctly on the tubular component 1, the separating process is performed, in which the separating tools 12 are displaced around the circumference of the outer shell surface of the tubular component 1 along a predetermined separation trajectory 24, as also shown as the dashed line in FIG. 4. Depending on the complexity of the trajectory or the contour to be cut, the separating tools 12 may have to pass over the separation trajectory 24 several times.

Upon completion of the separating process, the separating arrangement 4 and the upper component part 1o are raised by the suspension assembly. The lower component part 1u remains on the mobile transport module 3 and is transported away as appropriate, and may be returned for reuse. See FIG. 5b in this regard.

FIG. 5c shows the lowering of the upper component part 1o, whose lower pipe end corresponds to the predetermined separation trajectory and thus has a front rim contour that differs from the original circular shape. The vertically adjustable bracing structures 16 are individually deflected vertically to match the front rim contour, so that the lower front rim of the upper component part 1o fits into the fork-like bracing structures 16 locally to guarantee a stable vertical support of the upper component parts 1o.

In the sequence step illustrated in FIG. 5d, the fastening arrangement of the separating arrangement 4 is released and detached from the upper pipe end 7. After the requisite vertical separation has been reached between the separating arrangement 4 and the tubular component 1o, the component 1o is transported away individually by the mobile transport module 3.

With the system for separating a tubular component according to the invention it is possible to carry out any cutting tasks to size on tubular components with any diameter and any initial length. In particular, it is possible to carry out contour cuts and prepare for weld seams on pipes and/or pipe sockets that are to be processed further to make pipe joints.

Through the use of a mobile transport module in conjunction with the spatially positionable separating arrangement, a compact, mobile complete system is created which may be set up at any production location and put into operation there with little effort. It is entirely conceivable that the system equipment may be operated at the construction site. It is also possible to use the system for the separating process explained in the preceding text to join two tubular components by corresponding replacement of the separating tool with a welding tool and arrangement of further linear units 10 in combination with manipulators 11 and a welding tool on the carrier ring module 9".

It is also possible to create a local hole in the shell surface of the base tube by corresponding specification of the separation trajectory within a base tube seated vertically on the mobile transport module. For this purpose, however, it is important to support the segment that is separated from the base tube with an additional, suitably constructed holding device to avoid damaging the cut contour on the base tube. Such a holding device should preferably provided inside the base tube in the region of the vertically displaceable bracing unit 17.

In a further preferred embodiment, measuring instruments are attached both to the separating arrangement and the transport module, and may be used for capturing the separation trajectory in advance and optimizing the adjustment of the contour of the tubular component to be separated during the separation process. The quality of separation and the dimensional accuracy of the separation trajectory may also be inspected. To this end, preferably contactless sensors are attached preferably to the ends of the manipulator units 10 and/or in the region of the pipe clamping device 14. This in turn enables the separating process to be monitored online, so that necessary corrections can be made in situ.

The measuring instruments for contactless capture of the tubular component in advance of the actual separating process serve mainly to deliver a precise determination of the geometry of the component itself. Accordingly, it often occurs that pipes with a pipe cross section that is not circular, for example an elliptical cross section, have to be connected in the joining process. For this purpose, it is important to design the joint contour of such pipes accordingly. The cross sectional geometries deviate from an ideal dimension not only but most frequently in the cross sections of elliptical pipe types, so that a cutting contour is created during the separating process with the specification of a numeric standard trajectory along which the separating tool is deflected, and this subsequently results in unacceptable gap size deviations when the pipes are joined later. In order to counteract the effects of such gap size deviations, the pipe segment to be processed is measured extremely precisely before the separation operation. This applies both for the base tube in shell of which a given cutout is to be created, and for a pipe socket, the pipe end must have a joint contour that is adapted exactly to the circumferential contour of the cutout in the base tube, which is specified by the separation trajectory.

The determination of the exact separation trajectory is therefore carried out on the basis of the currently measured pipe geometry, captured in each case with the measurement instrument.

LIST OF REFERENCE SIGNS

1 Tubular component
2 Receiving platform
3 Mobile transport module
4 Separating arrangement
5 Suspension assembly
5' Connecting means
6 Supporting structure
7 Upper pipe end
8 Fastening arrangement
8' Clamping jaws
8" Rollers
9 Support platen assembly
9' Lower support platen
9" Carrier ring module
10 Linear unit
11 Manipulator
12 Separating tool
13 Supply module
14 Pipe clamping device
15 Clamping block
15' Linear axis
16 Vertically adjustable bracing structure
17 Vertically displaceable bracing unit
17' Receiving platform
18 Holding device
19 Module carrier
20 Cable feed
21 Process gas feed
22 Connecting unit
23 Connecting lines
24 Separation trajectory
E Production plane, floor
D Axis of rotation
x,y,z Orthogonally oriented spatial axes
L Linear axis

The invention claimed is:

1. A system for separating a tubular component for constructing a supporting structure, the tubular component including a pipe with open first and second pipe ends, comprising:

a mobile transport module including a receiving platform including a pipe clamping device adaptable to different pipe diameters, which receives and vertically mounts the tubular component so that a first pipe end can be positioned into a detachable engagement with the pipe clamping device; and a separating arrangement which is mounted on a supporting structure that can be raised and lowered, includes a fastening arrangement for detachable and secure joining to a second pipe end, is seated vertically on the mobile transport module and engages with the pipe clamping device and includes at least one manipulator unit which is attachable to the fastening arrangement each having a freely positionable manipulator end to which a separating tool is attached, the tool being guidable along a controlled trajectory radially outside of the tubular component; and wherein the pipe clamping device comprises at least two clamping blocks which are moveably mounted and lockable along the receiving platform with the clamping blocks being located on at least one of inside or outside of the tubular component which is vertically mounted, are distributed evenly either on an inner wall or outer wall of the vertically mounted tubular component, and positionable to engage the tubular component for exerting clamping forces which are at least one of directed radially outward and radially inward against at least one of the inner wall and the outer wall; the clamping blocks each include a vertically adjustable bracing structure with each bracing structure engaging a region along a front rim of a lower pipe end which matches with the vertically mounted tubular component.

2. The system according to claim 1, wherein each bracing structure includes a fork-shaped receiving structure.

3. The system according to claim 1, comprising:
a vertically displaceable bracing unit mounted on the receiving platform on which a separating or a welding assembly is supported by a joint between the fastening arrangement and the tubular component.

4. The system according to claim 1, wherein the mobile transport module is one of a transport vehicle, a mobile loading unit, a load-bearing, a bottom supporting vehicle, and a device or a base platform operable in a production plane.

5. The system according to claim 1, wherein the fastening arrangement of the separating arrangement comprises a clamping module which is insertable at least partially in an axial front face of an upper end of the tubular component, is releasable, and provides attachment to the inner wall which is part of the tubular component, and includes a carrier ring module mounted rotatably to the clamping module and which in a joined state protrudes axially beyond an upper end of the tubular component and is in operative connection with a servomotor for driving the carrier ring module rotationally around a longitudinal axis of the pipe so that the carrier ring module is rotatable around the longitudinal axis of the pipe.

6. The system according to claim 5, comprising:
at least one linear supporting structure attached to the carrier ring module which is mounted to bidirectionally deflect parallel to a longitudinal axis of the tubular component and is positionable vertically on the receiving module by an actuator.

7. The system according to claim 6, wherein the activator is an at least 3-axis open kinematic chain configured as a vertical articulated-arm robot mounted on an end of the at least one supporting structure.

8. The system according to claim 6, comprising a supply module on which is mounted at least one of:
a control unit, an electrical power supply unit, and at least one reservoir for materials required for the separating process comprising at least a process gas;
the at least one component is connected to the separating tool via a connecting line;
the supply module is rotatably mounted for imparting a rotary motion around the longitudinal axis of the pipe simultaneously with movement of the separating tool which enables rotation of the cutting tool around the pipe longitudinal axis; and
the supply module is articulated on a supporting structure separated from the separating arrangement to be positionable at least along one plane, or the supply module is connected to the carrier ring module.

9. A method in a system in accordance with claim 1 comprising:
positioning the tubular component relative to a vertically oriented longitudinal pipe on a mobile transport module;
positioning the tubular component relative to a separating arrangement which is mounted on a supporting structure to be at least raised and lowered vertically;
depositing and securing the separating arrangement on an upper pipe end of the tubular component which is seated vertically on the transport module;
separating the tubular component along a separating curve to obtain component parts that are disconnected from each other to form lower and an upper component parts by use of the separating arrangement;
lifting and transporting the upper component with a separating welding assembly; and
transporting the lower component part which is supported on the mobile transport module.

10. The method according to claim 9, comprising:
bracing the separating arrangement against the mobile transport module separately from the tubular component.

11. The method according to claim 9 comprising:
performing the separation by using at least one separating tool which is located radially outside the tubular component and which is guided along the separating curve around the tubular component.

12. The method according to claim 9, comprising:
capturing the tubular component to be separated without contact at least before and during the separation process; and
monitoring the separating process and making corrections in situ.

13. A method of use of the system according to claim 1 for reworking a tubular component in a grinding process, comprising:
replacing a separating tool attached to an end of a manipulator end with a grinding tool with the separating arrangement being seated on the tubular component by machining a radially outer shell surface of the tubular component.

* * * * *